United States Patent [19]

Clough

[11] Patent Number: 5,968,138
[45] Date of Patent: Oct. 19, 1999

[54] METHOD AND APPARATUS FOR PERIPHERAL SYSTEM MANAGEMENT, USING MULTIPLE OBJECT INTERFACES

[75] Inventor: James Clough, Meridian, Id.

[73] Assignee: Hewlett-Packard Company, Palo Alto, Calif.

[21] Appl. No.: 09/298,621

[22] Filed: Apr. 23, 1999

[51] Int. Cl.[6] ........................................... G06F 13/10
[52] U.S. Cl. ..................................... 710/8; 709/302
[58] Field of Search ........................... 713/1, 100; 710/8, 710/10, 62, 63; 709/300–303

[56] References Cited

U.S. PATENT DOCUMENTS

| | | | |
|---|---|---|---|
| 5,390,301 | 2/1995 | Scherf | 709/300 |
| 5,465,364 | 11/1995 | Lathrop et al. | 709/301 |
| 5,566,346 | 10/1996 | Audert et al. | 710/8 |
| 5,701,483 | 12/1997 | Pun | 709/301 |
| 5,822,565 | 10/1998 | DeRosa, Jr. et al. | 395/500.45 |

*Primary Examiner*—Paul V. Kulik

[57] ABSTRACT

The method of the invention enables an application program to recover feature information regarding a managed entity without having any predefined knowledge regarding the managed entity. The method employs a database that is operated by a database management program which includes data structures that define each of plural managed entities and each management interface associated therewith. A "managed entity" is a data structure that lists all "management interfaces" present in a device that is to be utilized by a processor. A "management interface" is a data structure that includes one or more procedures for accessing a device and obtaining information regarding the device and a "proxy management interface" is a data structure that is established to store previously retrieved feature data. All devices with a same feature can be accessed by an identical management interface procedure. Accordingly, an application merely needs to know how to deal with managed entity and management interfaces to obtain either capability or status information regarding a device.

8 Claims, 2 Drawing Sheets

METHOD AND APPARATUS FOR PERIPHERAL SYSTEM MANAGEMENT, USING MULTIPLE OBJECT INTERFACES

FIELD OF THE INVENTION

This invention relates to interface functions that enable communication between application programs and peripheral devices and, more particularly, to a method and apparatus for enabling an application program to interact with a peripheral device.

BACKGROUND OF THE INVENTION

Peripheral systems consist of peripheral devices, peripheral clients and peripheral servers. A peripheral device may include a printer, a scanner, or multi-function devices. A peripheral client is a computer that makes use of the peripheral device. A peripheral server is a computer that makes a peripheral device and its services available to a peripheral client, generally over a network or a communication interconnection.

Managing a peripheral system involves the configuring of peripheral devices, obtaining their status and receiving events from these peripheral devices. The capabilities of peripheral devices vary widely. Communication protocols used for interacting with the devices also vary widely. Software that manages interactions between peripheral clients and peripheral devices must accommodate this variety of capabilities and protocols. Further, vendors constantly ship new models of peripherals, peripheral servers and peripheral clients. Software for managing these changes must be constantly revised to support the new devices and new device features. All of this significantly increases the complexity of software used to manage a peripheral system.

Prior art programs that enabled a peripheral client to access the capabilities of a peripheral device and data regarding functions performed by the peripheral device, have caused such data to be stored in a file associated with an application program running on the peripheral client. For instance, one prior art technique for enabling peripheral clients/peripheral device communication utilized a get/set interface with a collection of objects types. To retrieve information about a peripheral device, the application program would issue a "get" request for a desired object type. In response, peripheral abstraction codes would retrieve the requested information from the peripheral device and send it back to the caller in a data buffer. Likewise, if the application program needed to configure a setting in the peripheral device, it would enter the setting data into a data buffer and issue a set request to an appropriate object type, passing the buffer thereto.

In order for such prior art systems to provide enhanced performance, the results of many of the get and set requests were cached in a database associated with the application program, for future use. If a subsequent request was made for data that had already been previously retrieved and cached, the new request was serviced from the cache in the application (rather than over the network from the device itself). Avoiding additional network traffic provided a significant performance advantage, versus not having the data cached at all.

The prior art solution, to implement the cache model, stored a copy of the data buffer in the application's database, when the object was first requested. Then, if the object was requested again, the copy of the stored buffer was returned to the caller. This function was enabled by simply routing all object requests through the database first.

Accordingly, it is an object of this invention to provide an improved procedures for the management of device communications in a peripheral system.

It is another object of this invention to separate peripheral status and capability data from application programs so as to isolate the application programs from change requirements when peripheral devices are added or modified.

It is still another object of this invention to utilize the benefits provided by object-oriented programming languages to enable improved peripheral system management.

SUMMARY OF THE INVENTION

The method of the invention enables an application program to recover feature information regarding a managed entity. The method employs a database that is operated by a database management program (DBMP) which includes data structures that define each managed entity and each management interface. A "managed entity" is a data structure that lists all "management interfaces" present in a device that is to be utilized by a processor. A "management interface" is a data structure that contains one or more procedures for interacting with a managed device. A "proxy management interface" is a data structure that is established to store previously retrieved device data. All devices with a same feature use an identical management interface data structure.

Initially, an application program dispatches a request for specific feature information regarding a device defined by a managed entity data structure. In response, the name of a management interface associated with the managed entity data structure is identified which includes a procedure that will retrieve the requested information. If no "proxy" management interface is associated with the management interface (meaning that the requested information is not stored in a cache memory), the method establishes a proxy management interface data structure, and returns the name to the application program.

Thereafter, the application program issues a request (i.e. "get capabilities") that is directed to the proxy management interface data structure and causes either the requested information to be returned from the device or from a cache (if the requested data is present in the cache). Accordingly, the application program is relieved of any requirement to have aforeknowledge regarding the feature information for the managed entity.

DETAILED DESCRIPTION OF THE INVENTION

Figure 1:
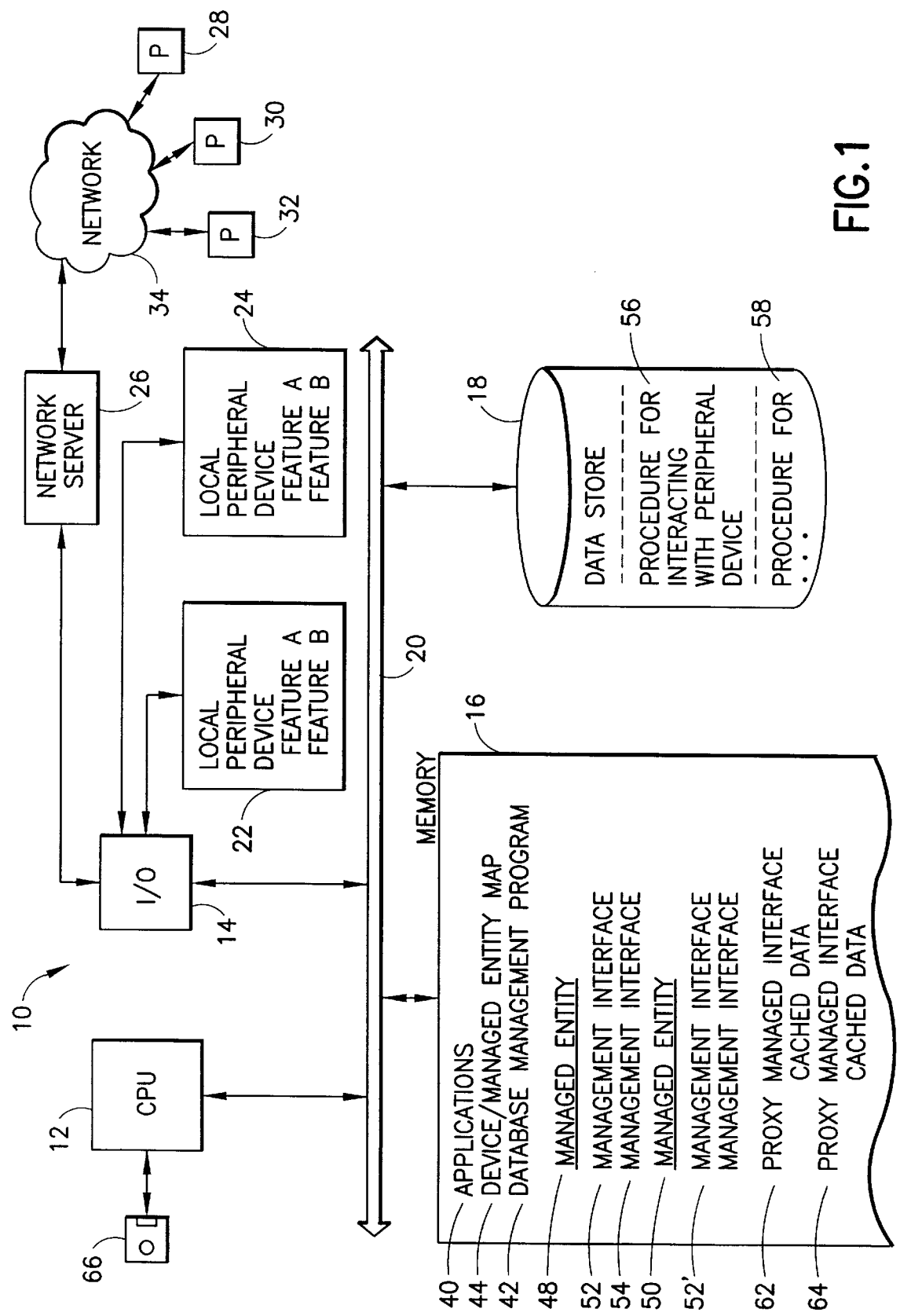
FIG. 1 is a block diagram of a system particularly adapted to carry out the method of the invention.

Referring to FIG. 1, a computer 10 includes a central processing unit (CPU) 12, an input/output (I/O) module 14, a random access memory (RAM) 16 which includes software that operates in conjunction with CPU 12 and a persistent data store 18 (e.g., a disk drive). Communications between each of the aforesaid devices are handled by bus system 20. A pair of local peripheral devices 22 and 24 are coupled to computer 10 via input/output module 14. In addition, I/O module 14 enables connections to be established between computer 10, a network server 26 and one or more of a plurality of peripheral devices 28, 30 and 32, via network 34.

An application program 40 running on computer 10 desires to access a peripheral device (either local or remote) and to access information regarding features of the peripheral device or to cause the peripheral device to perform a function. Memory 16 is provided with a plurality of software data structures that enable such actions to be accomplished. As will be understood, the data structures within memory 16 are established in such a manner that an application 40 need have no advance information regarding the functions or capabilities of a peripheral device. Application 40 must just know how to interact with a defined set of data structures to enable the acquisition of information from the device or to have the device perform a function.

Memory 16 thus includes a database management program 42 that controls a plurality of data structures which enable the acquisition of status and capability information. A device/managed entity map 44 correlates individual peripheral device names with managed entity objects contained within a database in memory 16. There is at least one managed entity data structure (e.g., 48, 50) for each peripheral device. For instance, assume that managed entity data structure 48 corresponds to peripheral device 28 (that is coupled to network 26). Assume further that a managed entity data structure 50 corresponds to local peripheral device 22.

Each managed entity data structure includes a listing of management interfaces (e.g., 52, 54), which are, essentially, pointers to storage regions within data store 18 where a set of procedures is stored for interacting with peripheral devices. Thus, management interface 52 includes a pointer to procedure 56 in data store 18, which procedure defines a method for interacting with a particular peripheral device to either obtain data regarding the device or to have the device perform a function. Similarly, management interface 54 may point to procedure 58 in data store 18 which defines another method for interacting with a peripheral device. Accordingly, for each particular kind of management interface, there is at least one corresponding entry in data store 18 that comprises a procedure for interacting with a peripheral device. In such manner, each management interface for a managed entity will point to one or more procedures in data store 18 that enable information regarding functional capabilities of a peripheral device to be recovered. Further, management interfaces 52 and 52' for managed entities 48 and 50, respectively, may both point to the same procedures in data store 18. They also may point to different procedures. For a given device, a managed entity may point to 20 or 30 procedures.

A further set of data structures is provided in memory 16 which obviates the necessity to contact a peripheral device each time application program 40 executes a procedure associated with a management interface. Those data structures comprise proxy management interfaces 62, 64, etc., each of which denotes cached data defining previously accessed information. More specifically, after receiving a management interface and its associated procedures, the application executes one or more of the procedures, causing communication over the network with a peripheral device. Assume for example, that the procedure obtains from the peripheral device a list of optional accessories installed on the device. Each time the application requires this information, it must be obtained over the network, which is a time-consuming process.

To avoid such recurrent accesses over the network, the application may be given a proxy management interface in response to its request. The proxy management interface appears to the application exactly the same as the real management interface. When the application executes a procedure on the proxy management interface, the proxy management interface calls the real management interface to obtain the requested information. Once the information is obtained, it then caches the information before returning it to the application. If the application later calls the procedure again, the proxy management interface simply returns the cached data, obviating the need to communicate with the peripheral device.

In the above description, it has been assumed that all of the procedures necessary to implement the invention are already loaded into memory 16. Those skilled in the art will realize that the procedures may be incorporated into a memory media such as a floppy disk 66 or a corresponding compact disk and loaded on an as-needed basis.

Figure 2:
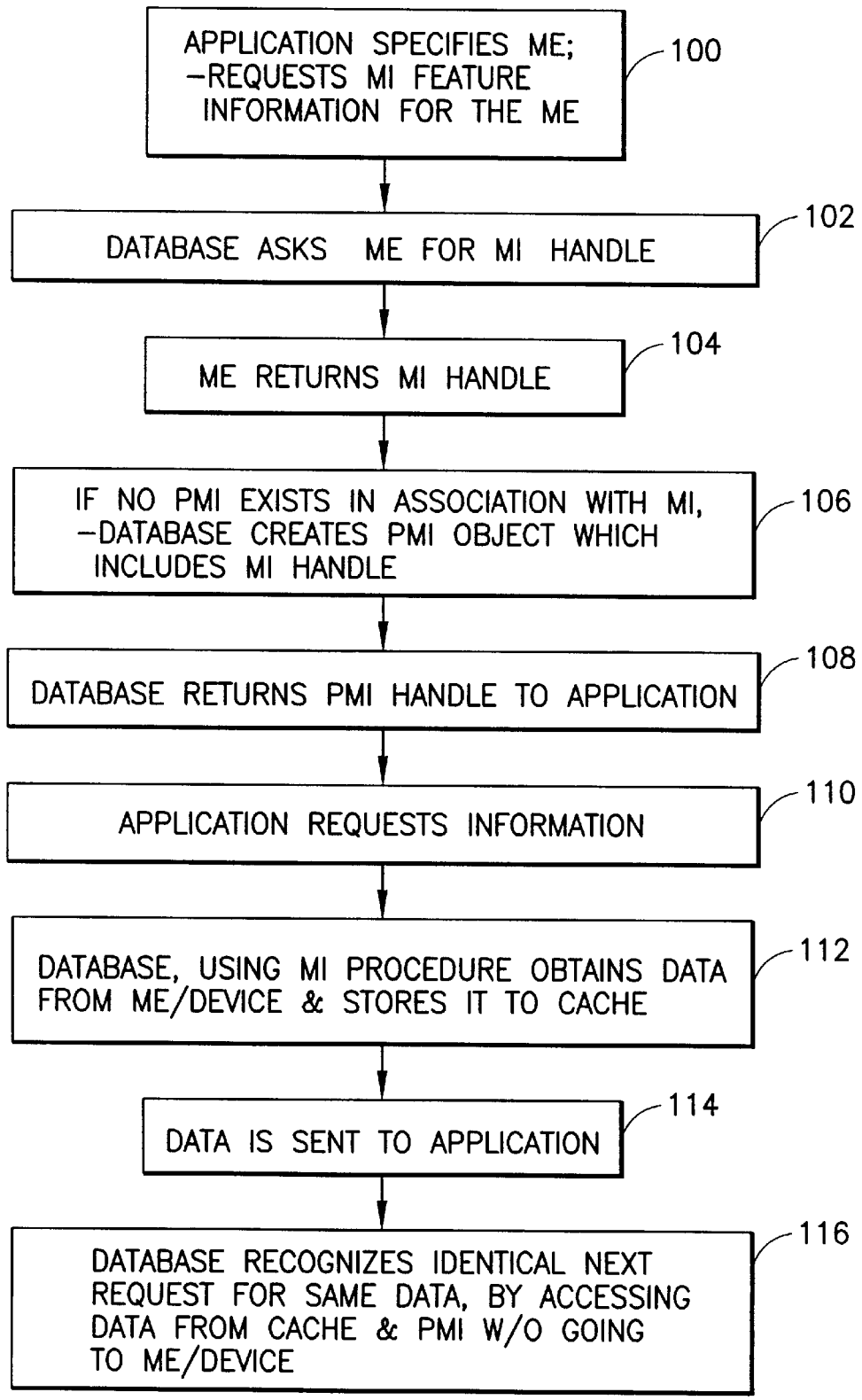
FIG. 2 is a logical flow diagram showing the steps implemented by the system of FIG. 1.

Turning now to FIG. 2, the method of the invention will be described in conjunction with the devices shown in FIG. 1. Initially, assume that an application 40 specifies a peripheral device and requests a management interface capability for the device (step 100). Database management program 42 responds to the request by determining a managed entity which corresponds to the requested device, and requests from the managed entity a handle of a management interface which includes a procedure that will return the requested interface capability (step 102). In response, the handle of a management interface (e.g., 52) listed within the addressed managed entity (e.g., 48) is returned to database management program 42 (step 104).

Assuming that no proxy management interface exists that corresponds to management interface 52, database management program 42 creates a proxy management interface object and inserts the handle of the management interface 52 (step 106).

At this point, database management program 42 returns the handle of the proxy management interface object (e.g., 62) to application program 40 (step 108). Thereafter, application 40 requests the interface data from proxy management interface 62 (step 110), which not having the data causes management interface 52 to execute a procedure that accesses the peripheral device and obtains the requested information. That information is returned to proxy management interface 62 which both stores it to cache and provides it to application 40.(steps 112 and 114).

If it is assumed that a proxy management interface was already in place for the requested management interface, then the process examines the cached data pointed to by the proxy management interface, to access the information that is stored therein. In either case, the information is returned to application program 40 by proxy management interface 62.

Thereafter, if an application 40 (or some other application) issues a request for the same information regarding the peripheral device, the request is directed to proxy management interface 62 and the requested data is accessed from cache, without having to access the information from the peripheral device.

As can be seen from the above, the provision of the managed entity, management interface and proxy management interface data structures enable an isolation of device capabilities from an application 40. Thus, it is only the database management program 42 which needs to be updated upon a change of device capability or functions.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

I claim:

1. A method for enabling an application program to access information regarding a specific device, said method employing a database that includes a managed entity (ME) data structure for each one of a plurality of devices, each ME data structure associated with one or more management interface (MI) data structures that contain one or more procedures for interacting with a device and an associated ME data structure, said method comprising the steps of:

a) responding to a request from said application program for information regarding a device, by requesting an MI data structure that will enable retrieval of said information;

b) if a proxy MI data structure exists that corresponds to said MI data structure, returning to said application program a handle of said proxy MI data structure, and if no said proxy MI data structure exists, creating a corresponding MI data structure and returning a handle thereof to said application program;

c) employing said proxy MI data structure to request information regarding said specific device, and if said information is resident in cache, providing said information to said application;

d) if said data is not resident in said cache, employing a method of said MI data structure to access said device and to obtain said information from said device and to return said information to said application program; and d) caching said information returned in step d).

2. The method as recited in claim 1, wherein step a) accesses a name of an ME data structure that corresponds to said specific device and determines a name of said MI data structure therefrom.

3. The method as recited in claim 1, wherein each MI data structure includes one or more procedures that may be used with plural devices to obtain common types of information regarding such devices.

4. The method as recited in claim 3, wherein all MI data structures that retrieve a same type of device information are of the same object type.

5. A memory media for controlling a computer to enable an application program to access information regarding a specific device, said computer including a database that includes a managed entity (ME) data structure for each of a plurality of devices, each ME data structure associated with one or more management interface (MI) data structures that contain one or more procedures for interacting with a device and an associated ME data structure, said memory media comprising:

a) means for controlling said computer to respond to a request from said application program for information regarding a device, by requesting an MI data structure that will enable retrieval of said information;

b) means for controlling said computer to return to said application program a handle of a proxy MI data structure if a proxy MI data structure exists that corresponds to said MI data structure, and if no said proxy MI data structure exists, to create a corresponding MI data structure and to return a handle thereof to said application program;

c) means for controlling said computer to employ said proxy MI data structure to request information regarding said specific device, and if said information is resident in cache, to provide said information to said application;

d) means for controlling said computer, if said data is not resident in said cache, to employ a method of said MI data structure to access said device and to obtain said information from said device and to return said information to said application program; and d) means for controlling said computer to cache said information returned by means d).

6. The memory media as recited in claim 5, wherein means a) initially accesses a name of the ME data structure that corresponds to said specific device and determines said MI data structure as being associated therewith.

7. The memory media as recited in claim 5, wherein each MI data structure includes one or more procedures that may be used with plural devices to obtain common types of information regarding such devices.

8. The memory media as recited in claim 7, wherein all MI data structures that retrieve a same type of device information are of the same data object type.

* * * * *